United States Patent [19]

Roebke et al.

[11] 4,222,995

[45] Sep. 16, 1980

[54] PROCESS FOR THE PRODUCTION OF ALUMINUM SILICATES

[75] Inventors: Wolfgang Roebke, Altenstadt; Dieter Kneitel; Erfried Parr, both of Rodenbach, all of Fed. Rep. of Germany

[73] Assignees: Deutsche Gold- und Silber-Scheideanstalt vormals Roessler, Frankfurt; Henkel & Cie, Dusseldorf-Holthauser, both of Fed. Rep. of Germany

[21] Appl. No.: 667,195

[22] Filed: Mar. 15, 1976

[30] Foreign Application Priority Data

Apr. 2, 1975 [DE] Fed. Rep. of Germany ....... 2514399

[51] Int. Cl.³ ............................................. C01B 33/28
[52] U.S. Cl. ................................. 423/329; 252/89.1; 252/131; 423/328
[58] Field of Search .................... 423/328, 329, 330; 252/455 Z, 89, 131; 241/30

[56] References Cited

U.S. PATENT DOCUMENTS

| | | | |
|---|---|---|---|
| 2,882,243 | 4/1959 | Milton | 423/328 |
| 3,310,373 | 3/1967 | Johnson | 423/329 |
| 3,789,107 | 1/1974 | Elliott | 423/329 |
| 3,864,282 | 2/1975 | Young | 252/455 Z |
| 3,985,669 | 10/1976 | Krummel et al. | 252/89 R |

FOREIGN PATENT DOCUMENTS

| | | |
|---|---|---|
| 1038017 | 9/1958 | Fed. Rep. of Germany . |
| 1592298 | 12/1970 | Fed. Rep. of Germany . |
| 1497110 | 10/1967 | France . |
| 1536947 | 9/1968 | France . |
| 1570090 | 6/1969 | France . |
| 2017745 | 5/1970 | France . |
| 2096141 | 2/1972 | France . |
| 2167709 | 8/1973 | France . |
| 83978 | 9/1969 | German Democratic Rep. ..... 423/328 |
| 1049363 | 11/1966 | United Kingdom ..................... 423/329 |

*Primary Examiner*—Edward J. Meros
*Attorney, Agent, or Firm*—Cushman, Darby & Cushman

[57] ABSTRACT

Alkali aluminum silicates, particularly a zeolitic molecular sieve powder with an average particle diameter of less than $10\mu$ and having the portion of particles with a particle size above $45\mu$ being less than 1 weight % are prepared by hydrothermal crystallization of an alkali aluminate-silicate mixture, separating the crystallization product from the mother liquor and drying with the proviso that the aqueous medium surrounding the crystallization product is adjusted to a pH value between 8.5 and 11 prior to the drying. The product is used as an ion exchanger, e.g., in dehardening water, particularly as a phosphate substitute in washing, rinsing and cleansing agents.

3 Claims, No Drawings

PROCESS FOR THE PRODUCTION OF ALUMINUM SILICATES

The invention is directed to a process for the production of alkali aluminum silicates, particularly a zeolitic molecular sieve powder with an average particle diameter of below 10μ and having the portion of particles above 45μ in diameter less than 1 weight % by hydrothermal crystallization of an aluminate-silicate mixture (i.e., an alkali metal aluminate-alkali metal silicate mixture) wherein the crystallization product is separated from the mother liquor and dried, as well as being directed to the alkali aluminum silicates produced by the process and their use.

Zeolitic molecular sieves and their specific properties for ion exchange and adsorption have been known for a long time. Thus, reference is made to Breck, *Zeolite Molecular Sieves*, John Wiley & Sons, New York, N.Y., 1974. The entire disclosure of Breck is hereby incorporated by reference as background material.

Alkali aluminum silicates, particularly zeolitic molecular sieves with their special properties for ion-exchanging adsorption, have been known for a long time. Their synthesis depends on heating an aqueous mixture with the composition $$a\ Na_2O \times b\ Al_2O_3 \times c\ SiO_2$$

to temperatures between 50° and 300° C.

The known processes have in common that in the synthesis, there are obtained crystals whose average diameter is above about 2μ whereby a considerable portion, usually between 3 and 13 weight % has border grains (limiting particles) above 45μ. This portion is designated grit. It is ascertained according to German Industrial Standard 53580 (DIN 53580) by wet-sieving according to Mocker.

In our prior application Ser. No. 617.394, filed Sept. 29, 1975, the entire disclosure of which is hereby incorporated by reference and relied upon, there is described a process for the production of alkali aluminum silicates by hydrothermal crystallization with at least 99.5 weight % of the particles having a diameter below 45μ. In the drying of the separated, still-wet product obtained according to this process, there is found again a large portion of grit which is undesired for the further use of the product, e.g., as an additive to washing, rinsing and cleansing agents.

The molecular sieves are converted into molded articles with a suitable binder when they are to be used as adsorption agents, carriers for catalysts or as ion exchangers. The production of the molded article requires a large industrial expense while simultaneously reducing the effect because of the binder component. Also, because of the long diffusion passage, the speed of reaction is greatly retarded which, inter alia, makes the drying of organic liquids troublesome. Furthermore, for example, in the removal of metals from added waters or waste waters, ion exchanger and precipitate must be separated. It is, therefore, logical to add a powdery molecular sieve for such uses. Also, molecular sieve powders are added in lacquers.

The invention is based on the problem of creating a process of producing a powdery alkali aluminum silicate, as, for example, zeolitic molecular sieves without a larger portion of particles over 45μ, i.e., having a lower grit portion, which molecular sieves are especially useful as ion exchangers, e.g., for water-softening. The absence of grit is indispensable for a number of uses within the invention, e.g., use of such molecular sieves as phosphate replacements in washing and purificatiion processes. Washing and purification processes, especially in machines, imply, indeed, a slight tendency for quiescent setting of the molecular sieve in the wash liquor in order to make possible a residue-free rinsing after completion of the process and therewith prevent a dust on the dry wash.

The object of the invention is to develop a process for the production of alkali aluminum silicates, particularly a zeolitic molecular sieve powder, with an average particle diameter of less than 10μ and having the portion of particles with a particle size above 45μ being less than 1 weight % by hydrothermal crystallization of an alkali aluminate-silicate mixture, separating the crystallization product from the mother liquor, and drying, with the proviso that the aqueous medium surrounding the crystallization product is adjusted to a pH value between 8.5 and 11 prior to the drying.

A zeolitic molecular sieve powder produced according to the invention can contain different types of zeolites, all of which are alkali aluminum silicates. However, they are different in their structures and compositions.

Preferably, there are produced by the process of the invention zeolites A, X and/or Y; wherein a zeolitic molecular sieve of type A has the summation formula $1.0 \pm 0.2\ M_{2/n}O:Al_2O_3:1.85 \pm 0.5\ SiO_2:y\ H_2O$, wherein M is a metal cation, n is its valence and Y has a value up to 6.

The composition of molecular sieves of type X correspond to the formula $0.9 \pm 0.2\ M_{2/n}O:Al_2O_3:2.5 \pm 0.5\ SiO_2:O$ to $8\ H_2O$, wherein M is a metal cation and n is its valence.

A zeolitic aluminum silicate of type Y has a composition of the formula $0.9 \pm 0.2\ M_{2/n}O:Al_2O_3:xSio_2:y\ H_2O$, wherein x has a value greater than 3 and y has any value up to 9.

Of the group of alkali metals in these zeolite types, there are preferably employed the elements lithium, potassium and/or sodium.

Preferably, the aqueous medium is regulated to a pH between 9 and 10.5.

The regulation of the pH can be effected by the addition of acids, e.g., sulfuric acid, before the separation of the crystallizatiion product from the product slurry. The particular acid used to adjust the pH is not critical.

According to another form of the invention, the crystallization product already separated from the slurry can be made into a paste with water and regulation of the pH effected by addition of acid, e.g., sulfuric acid. The separation of the crystallization product mentioned above can be accomplished by any known process, such as filtration, decantation or centrifugation, for example.

Furthermore, the pH can be regulated if the separated crystallization product is washed with water or with acidified water, whereby the wash water is again acidified and is recycled in the washing process. For acidification of the wash water, there can be used inorganic acids, such as $H_2SO_4$, for example, or organic acids, e.g., p-toluene sulfonic acid.

Preferably, the water can be acidified with tartaric acid, citric acid and/or the acids used as constituents of anionic detergents, e.g., sulfonic acids, e.g., octylbenzene sulfonic acid, or dodecylbenzenesulfonic acid.

The anionic detergents usable in the invention contain, in the molecule, at least one hydrophobic organic radical and an anionic group imparting water-solubility, e.g., an alkali metal such as sodium or potassium or the ammonium group. As the hydrophobic radical, there are used, for the most part, aliphatic hydrocarbon radicals containing 8 to 26 carbon atoms, preferably 10 to 22 carbon atoms, and particularly, 12 to 18 carbon atoms, or an alkylaromatic radical with 6–18, preferably, 8–16, aliphatic carbon atoms. Examples of such materials include sodium octylsulfate, sodium octane sulfonate, sodium, sodium decane sulfonate, sodium octadecane sulfonate, sodium lauryl sulfate, sodium p-hexylbenzenesulfonate, sodium p-octadecylbenzenesulfonate.

As anionic detergents, there can be used, for example, soaps of natural or synthetic, preferably saturated, fatty acids; in a given case, soaps of resin and naphthenic acid can be used. Such soaps include sodium octanoate, sodium eicosanate, sodium stearate, potassium stearate, potassium oleate, sodium oleate, sodium palmitate, and sodium abietate. Furthermore, suitable synthetic anionic detergents include sulfonates, sulfates and synthetic carboxylates.

Thus, there can be used alkali metal salts of sulfates, having 8 to 22 carbon atoms in the alkyl residue such as sodium lauryl sulfate, potassium lauryl sulfate, sodium octadecyl sulfate, sodium coconut fatty alcohol sulfate, sodium octanyl sulfate, sodium alkyl ($C_{14}$–$C_{18}$) sulfate, as well as the corresponding long chain aliphatic sulfonates, e.g., sodium octanyl sulfonate, sodium dodecyl sulfonate, sodium tetradecyl sulfonate, sodium octadecyl sulfonate, potassium dodecyl sulfonate, ammonium dodecyl sulfonate, and sodium decyl sulfonate, sodium o-xylene sulfonate, potassium xylene sulfonate, potassium tertiary octylbenzene sulfonate, potassium dodecyl toluene sulfonate, sodium p-xylene sulfonate, sodium propyl naphthalene sulfonate, and sodium butylnaphthalene sulfonate.

As detergents of the sulfonate type, there can be used alkylbenzene sulfonates (e.g., $C_9$–$C_{15}$ alkyl) such as those set forth above, mixtures of alkene and hydroxyalkanesulfonates, as well as disulfonates, as can be obtained, for example, from mono-olefins with a terminal or inner double bond by sulfonation with gaseous sulfur trioxide and subsequent alkaline or acid hydrolysis of the sulfonation product. Also suited are alkanesulfonates which are obtainable from alkanes by sulfochlorination or sulfoxidation and subsequent hydrolysis or neutralization or by bisulfite addition on olefins. Additional usable detergents of the sulfonate type are esters of α-sulfo fatty acids, e.g., the α-sulfonic acids from hydrogenated methyl or ethyl esters of coconut, palm kernel or tallow fatty acids.

Suitable detergents of the sulfate type are sulfuric acid mono esters of primary alcohols (e.g., from coconut fatty alcohols, tallow fatty alcohols, or oleyl alcohol) and the like secondary alcohols. Furthermore, there are suited fatty acid monoglycerides or reaction products of 1 to 4 moles of ethylene oxide with primary or secondary fatty alcohols or alkylphenols, e.g., stearyl alcohol, hexadecyl alcohol, octylphenol or nonylphenol.

Furthermore, there are suitable as anionic detergents fatty acid esters or amides of hydroxy or aminocarboxylic acids or sulfonic acids of hydroxy or aminocarboxylic or sulfonic acids, e.g., fatty acids, sarcosides, glycolates, lactates, taurides or isethionates.

For regulation of the pH, furthermore, there can be used acids which frequently are employed in washing agents as complex formers or precipitation agents for calcium.

Such acids include, for example, polyhydroxycarboxylic acids, hydroxycarboxylic acids, aminocarboxylic acids, carboxyalkyl ethers, polyanionic polymeric carboxylic acids and phosphonic acids.

Examples of suitable polycarboxylic acids are dicarboxylic acids of the general formula HOOC—$(CH_2)_n$—COOH where n is 0 to 8, e.g., oxalic acid, malonic acid, succinic acid, glutaric acid, adipic acid, suberic acid and sebacic acid, as well as maleic acid, methylene malonic acid, citraconic acid, mesaconic acid, itaconic acid, non-cyclic polycarboxylic acids with at least 3 carboxyl groups in the molecule, as, e.g., tricarballylic acid, aconitic acid, ethylene tetracarboxylic acid, 1,1,3,3-propanetetracarboxylic acid, 1,1,3,3,5,5-pentanehexacarboxylic acid, hexanehexacarboxylic acid, cyclic di- or polycarboxylic acids, as, e.g., cyclopentane-tetracarboxylic acid, cyclohexane-hexacarboxylic acid, tetrahydrofurane-tetracarboxylic acid, phthalic acid, terephthalic acid, benzene tri-, tetra- or pentacarboxylic acids, e.g., trimellitic acid, hemimellitic acid, trimesic acid, pyromellitic acid, mellitic acid.

Examples of hydroxy mono- and polycarboxylic acids are glycolic acid, lactic acid, malic acid, tartronic acid, methyl tartronic acid, gluconic acid, glyceric acid, citric acid, tartaric acid, salicylic acid, saccharic acid.

Examples of aminocarboxylic acids are glycerine, glycylglycine, alanine, asparagine, glutamic acid, aminobenzoic acid (e.g., p-aminobenzoic acid), iminodiacetic acid, iminotriacetic acid, hydroxyethyl-iminodiacetic acid, ethylenediamine tetraacetic acid, hydroxyethyl ethylenediamine triacetic acid, diethylenetriamine pentaacetic acid, as well as higher homologues which can be produced by polymerization of an N-aziridyl carboxylic acid derivative, e.g., of acetic acid, succinic acid, tricarballylic acid, and subsequent saponification, or by condensation of polyamines with a molecular weight of 500 to 10,000 with chloroacetic acid salts, e.g., sodium monochloroacetate or bromoacetic acid salts, e.g., sodium bromoacetate.

Examples of carboxyalkyl ethers are 2,2-oxydisuccinic acid and other ether polycarboxylic acids, particularly carboxymethyl ether groups containing polycarboxylics to which belong the corresponding derivatives of the following polyhydric alcohols or hydrocarboxylic acid which can be completely or partially etherified with glycolic acid, ethylene glycol, propylene glycol, di- or triglycols, e.g., diethylene glycol, triethylene glycol, dipropylene glycol, glycerine, diglycerine, triglycerine, glycerine monomethyl ether, 2,2-dihydroxymethyl propanol, 1,1,1-trihydroxymethyl ethane, trimethylolpropane, erythritol, pentaerythritol, glycolic acid, lactic acid, tartronic acid, methyl tartronic acid, glyceric acid, erythronic acid, malic acid, citric acid, tartaric acid, trihydroxyglutaric acid, saccharic acid or mucic acid.

As transition types to the polyanionic polymers, there can be mentioned the carboxymethyl ethers of sucrose, starch and cellulose, e.g., carboxymethyl cellulose.

The polymeric carboxylic acids play a special role among the polyanionic polymers, as, e.g., the polymers of acrylic acid, hydroxyacrylic acid, maleic acid, itaconic acid, mesaconic acid, aconitic acid, methylene malonic acid, citraconic acid and the like, the copolymers of the above-named ethylenically unsaturated acids with each other and/or with other ethylenically unsaturated compounds, such as ethylene, propylene, isobutylene, vinyl alcohol (made, for example, by hydrolyzing an acrylic acid-vinyl acetate copolymer), vinyl methyl ether, furane, acrolein, vinyl acetate, acrylamide, acrylonitrile, methacrylamide, methacrylic acid, crotonic acid, etc., as, e.g., the 1:1 (molar) copolymer of maleic anhydride and ethylene or propylene or furane.

Further polyanionic polymers of the type of polyhydroxy polycarboxylic acid or polyaldehydo polycarboxylic acid are essentially materials built of acrylic acid and acrolein units or acrylic acid and vinyl alcohol units which are obtainable by copolymerization of acrylic acid and acrolein or through polymerization of acrolein and subsequent Cannizzaro reaction, in a given case in the presence of formaldehyde.

Examples of phosphorus containing organic complex formers are alkane polyphosphonic acids, amino and hydroxyalkane polyphosphonic acids and phosphono carboxylic acids, as, e.g., the compounds methanediphosphonic acid, propane-1,2,3-triphosphonic acid, butane-1,2,3,4-tetraphosphonic acid, hydroxymethane diphosphonic acid, chloromethane diphosphonic acid, methanetetraphosphonic acid, polyvinyl phosphonic acid, 1-aminoethane-1,1-diphosphonic acid, 1-amino-1-phenyl-1,1-diphosphonic acid, aminotrimethylene triphosphonic acid, methylamino or ethylamino dimethylenediphosphonic acid, ethylene diaminotetramethylene tetraphosphonic acid, 1-hydroxyethane-1,1-diphosphonic acid, phosphonoacetic acid, phosphonopropionic acid, 1-phosphonoethane-1,2-dicarboxylic acid, 2-phosphonopropane-2,3-dicarboxylic acid, 2-phosphonobutane-1,2,4-tricarboxylic acid, 2-phosphonobutane-2,3,4-tricarboxylic acid, as well as a mixed polymerizate of vinylphosphonic acid and acrylic acid.

There can be used known atmospheric and vacuum driers to dry the separated crystallization product. Such are described, for example, in Ullmann's Encyclopadie der technischen Chemie, Vol. 1., 1957, 3rd Edition, pages 563 to 609.

The invention likewise includes alkali aluminum silicates with an average particle diameter of less than $10\mu$ and having the portion of particles above $45\mu$ below 1 weight %, which silicates are obtainable, among others, according to the above-described process.

Furthermore, the invention concerns the use of the alkali aluminum silicates as ion exchangers, for example, for dehardening water (i.e., for water softening), particularly as a phosphate substitute in washing, rinsing and cleansing agents.

The products of the invention have the advantage that they are produced in grit-free form. In their use as water softeners in washing, rinsing and cleansing agents, therefore, they can be easily suspended in the particular washing liquor and can be particularly easily rinsed out of washing and cleansing machines. The wash treated with a washing agent that is grit free, i.e., containing no particles with a size above $45\mu$ is dust free after drying.

Furthermore, this process of the recycling washing with the water acidified within inorganic or organic acids, e.g., sulfonic acids, has the advantage that by the formation of sodium salts of sulfuric acid or the organic acids, e.g., sulfonic acids, there is avoided a loading of the waste water with high concentrations of acids and/or salts because these are adsorbed by the washed alkali aluminum silicate.

Since such sodium salts as the neutral salts $Na_2SO_4$ or NaCl or salts of sulfonic acids are added to the washing agent in a percentage which at times is high, the absorption of these salts in the alkali aluminum silicates of the invention during the neutralization process is not undesired.

Unless otherwise indicated, all parts and percentages are by weight.

The invention will be further explained in connection with the following illustrative examples.

I. PRODUCTION OF THE ALKALI ALUMINUM SILICATE

EXAMPLE 1

(Zeolite of Type A)

7 kg. of commercial moist hydrate, an aluminum oxide hydrate with a water content determinable by loss on ignition of 42.5% was dissolved in 50 liters of 12 weight % sodium hydroxide at 100° C. The clear solution obtained was cooled to 80° C. The further treatment took place in a 60 liter glass vessel which was equipped with a stirrer. The power required can be measured by an ammeter. The speed of stirring was regulated continuously. The stirrer was an Ekato-Turbo stirrer according to DIN (German Industrial Standard) 28131 having a diameter of 15 cm. The stirred container had a diameter of 40 cm and had 4 flow breakers at angles of 90°.

The precipitation took place while there was dosed in through a tube which ended approximately 0.5 cm above the disc of the turbine stirrer. 8.8 liters of waterglass which contained 26.5 weight % $SiO_2$ and 8 weight % $Na_2O$.

Before the beginning of the precipitation there was present in the stirred container 15 liters of aluminate solution. The rest was fed in simultaneously with the waterglass to the reaction mixture. The precipitation was completed after 30 minutes. The precipitated product was x-ray amorphous. In the reaction mixture the components were present in the mole ratio $H_2O:Na_2O=33$ and $SiO_2:Al_2O_3=1.3$.

At the end of the precipitation the stirrer required an energy of 0.8 $KW/m^3$. Now the reaction solution was brought to 90° C. with the help of steam. The progress of the crystallization which now began was observed based on the calcium binding capacity. By calcium binding capacity is meant the ion exchange capability of 1 gram of product which had been dried for 2 hours at 200° C. For the determination this amount was added to 1 liter of water which contained $CaCl_2$ corresponding to 300 mg. of CaO. Then it was filtered and the amount of CaO remaining in the water titrated complexometrically. The difference from the original 300 mg. gives the binding capacity of the zeolite. The crystallizatiion is complete when the Ca binding capacity no longer changes. After 80 minutes of reaction time there is attained the value 16.4 and then remains constant.

After the resulting crystallization the temperature was raised to 95° C. and the product allowed to temper under shear for 30 minutes more. The crystalline product obtained was then washed to pH 10.0 and then dried in the drying cabinet at 200° C. It had the X-ray diagram of Zeolite A as set forth in Milton German Pat. No. 1,038,017 and Milton U.S. Pat. No. 2,882,243.

EXAMPLE 2

(Zeolite of Type A)

5.5 kg. of moist hydrate (aluminum oxide hydrate) with a water content of 42.5% was dissolved in 50 liters of 10 weight % sodium hydroxide. The reaction vessel described in Example 1 was equipped with a propeller stirrer having a diameter of 15 cm according to DIN 28131. During the precipitation and crystallization the energy imput of the stirrer was 0.3 KW/m$^3$. As in Example 1 here also 15 liters of the aluminate solution was present at the beginning of the waterglass addition to guarantee sufficient efficiency of the stirring apparatus. The remainder of the sodium aluminate was fed in during the course of 30 minutes. Simultaneously there were fed directly to the propeller 6.8 liters of waterglass containing 26.5% $SiO_2$ and 8% $Na_2O$. The synthesis mixture thus obtained with a mole ratio of $SiO_2:Al_2O_3 = 1.3:1$ and $H_2O:Na_2O = 39:1$ was then crystallized at 93° C. After 90 minutes there was reached a Cabinding capacity of 168 mg. CaO/gram and the reaction was ended. Then the propeller was exchanged for a turbo-stirrer as described in Example 1 and tempered under the action of shearing energy at the same temperature, namely 93° C. with an introduction of energy of 0.8 KW/m$^3$. After 1 hour the reaction was discontinued, the product washed to pH 10.0 and then spray dried. There was obtained an X-ray graphically pure zeolite of Type A.

EXAMPLE 3

(Zeolite of Type A)

A synthesis mixture was prepared in a manner analogous to Example 2, which contained the components $SiO_2$ and $Al_2O_3$ in the ratio 1.3:1 and water and sodium oxide in the ratio 39:1. After the end of the precipitation step there was inserted a turbo stirrer having a diameter of 10 cm for shearing during crystallization. The energy input was 0.6 KW/m$^3$, the crystallization temperature 90° C. After 110 minutes the Ca binding capacity of the crystallized zeolite reached an end value of 161 mg. CaO/gram. Then the stirring apparatus was exchanged for a 3-stepped MIG ® stirrer of the firm Ekato and the synthesis mixture tempered for 4 hours at 92° C. with stirring (no shearing forces) with an energy increase of 0.1 KW/m$^3$. The product obtained was an X-ray graphically pure Zeolite A.

EXAMPLE 4

(Zeolite of Type A)

5.5 kg. of commercial moist hydrate (aluminum oxide hydrate) was dissolved in 50 liters of 11 weight % sodium hydroxide. The aluminate solution was pumped by a Static Mixer ® into a 60 liter reaction vessel. Before the mixture aggregated there were dosed in 8.2 liters of waterglass of the same composition as in Example 1. After the mixing process a water clear mixture ran into the reaction vessel. The solution was filtered off with suction at the bottom of the reaction vessel and recycled at a rate of 40 h$^{-1}$ by shearingly pumping through a centrifugal pump. The pump had an energy input of 1.8 KW/m$^3$. The synthesis mixture which had a ratio of $SiO_2:Al_2O_3$ of 1.6:1 and $H_2O:Na_2O$ of 37:1 was brought to 95° C. After 50 minutes the crystallization was concluded. Then the temperature was increased to 105° C. and tempered for 30 minutes under continuous shearing. The product obtained was pure Zeolite A.

EXAMPLE 5

(Zeolite of Type A)

4.5 kg. of commercial moist hydrate (aluminum oxide hydrate) were dissolved in 50 liters of 8 weight % sodium hydroxide. Then the solution was intensively mixed with 4.3 liters of waterglass solution (the same solution as in Example 1) using the same procedure as in Example 1. Hereupon the crystallization was carried out at 92° C. under the action of shearing forces in the manner described in Example 1 whereby the energy input was 1 KW/m$^3$. Tempering was carried out after the end of the crystallization with the same shearing energy and a temperature of 94° C. The alkali aluminum silicate obtained was X-ray graphically pure Zeolite A.

EXAMPLE 6

(Zeolite of Type X)

This zeolitic molecular sieve was produced by known process. Such processes are described in Donald W. Breck, Zeolite Molecular Sieves—Structure, Chemistry and Use, John Wiley and Sons, New York (1974), Chapter 4, pages 245-378. The Zeolite Type X had the following mole ratios $Na_2O:SiO_2 = 2.01$; $SiO_2:Al_2O_3 = 2.99$; $H_2O:Na_2O = 41.1$.

EXAMPLE 7

(Zeolite of Type Y)

This zeolitic molecular sieve was produced by known process. Such processes are also described in Breck, Zeolite Molecular Sieves (1974), Chapter 4, pages 245-378. The Zeolite Type Y had the following mole ratios $Na_2O:SiO_2 = 0.398$; $SiO_2:Al_2O_3 = 5.7$; $H_2O:Na_2O = 30.0$.

II. DRYING OF THE ALKALI ALUMINUM SILICATE

EXAMPLE 8

(According to the State of the Art)

An alkali aluminum silicate produced under each of Examples I 1 to 5 was separated over a rotary filter and washed. There was obtained a filter cake having 47.5 solids. 21.05 grams of this filter cake corresponding to 10.0 grams of dried solids were made into a paste in 1 liter of water and the pH determined. It was 11.5, i.e., the water in the undried filter cake had a pH value of 11.5.

(a) This filter cake was dried on a shelf drier at 250° C. and then ground on a toothed attrition mill. The zeolite obtained had the following particle spectrum.

| Fraction ($\mu$) | Portion (weight %) |
| --- | --- |
| <3 | 1.0 |
| <5 | 3.2 |
| <10 | 8.4 |
| <15 | 15.6 |
| <20 | 30.3 |
| <30 | 61.2 |
| <35 | 76.2 |

This particle spectrum was determined by sedimentation analysis by means of a sedimentation balance. The near mesh material was determined according to DIN 53580 by wet sieving on a Mocker apparatus. In this case it amounted to 8.9%.

EXAMPLE 9

(According to the Invention)

There was produced a filter cake analogous to that of Example II 8 using the Type A alkali aluminum silicate produced in each of Examples I 1 through 5 through a suitable operation of the rotary filter, i.e., by adding of sulfuric acid, the water surrounding the crystallization product was adjusted to a ph of 99. Then the drying was carried out on a shelf drier at 250° C. The dried product was ground in a toothed attrition mill and the particle spectrum determined by means of a sedimentation balance.

| Fraction ($\mu$) | Portion (weight %) |
|---|---|
| <3 | 8.5 |
| <5 | 16.2 |
| <10 | 63.5 |
| <15 | 86.4 |
| <20 | 97.8 |
| <25 | 99.6 |
| <30 | 100.0 |

The grit portion (particles above 45$\mu$) amounted to 0.03%.

The wash water requirement was 12 liters/1.00 kg. of product.

EXAMPLE 10

(According to the Invention)

An alkali aluminum silicate produced in a manner analogous to that employed in Example II 8 was washed by repeated decantations. Then the water surrounding the crystallization product was adjusted to a pH of 9.0 with sulfuric acid. The product was filtered off on a filter press and then dried at 350° C. in a rotary tubular drier. After grinding on a toothed attrition mill, there was ascertained the following particle spectrum which was determined by means of a sedimentation balance.

| Fraction ($\mu$) | Portion (weight %) |
|---|---|
| <3 | 3.5 |
| <5 | 10.4 |
| <10 | 30.8 |
| <15 | 80.2 |
| <20 | 96.6 |
| <25 | 98.7 |
| <30 | 99.5 |

EXAMPLE 11

(According to the Invention)

An alkali aluminum silicate produced in a manner analogous to that used in Example 8 was separated from the mother liquor on a band filter.

After the suction drying zone, the product was washed with water acidified with sulfuric acid to a pH of 4. After the use of 6 liters of wash water/kg. of product, the pH of the water surrounding the crystallization product reached 9.5. The finished product was dried in a rotary tube.

It had the following particle spectrum.

| Fraction ($\mu$) | Portion (weight %) |
|---|---|
| <3 | 9.9 |
| <5 | 19.2 |
| <10 | 80.0 |
| <15 | 95.6 |
| <20 | 100.0 |
| <25 | 100.0 |
| <30 | 100.0 |

EXAMPLE 12

(According to the Invention)

The zeolitic molecular sieve which was produced in a manner analogous to that used in Example 8 was separated off on a rotary filter without washing. The filter cake obtained was again made flowable with small amounts of water and then adjusted to a pH of 9 with sulfuric acid. The slurry obtained was dried on a shelf drier at 260° C. and the product ground. It contained 8% $Na_2SO_4$ and had the following particle spectrum.

| Fraction ($\mu$) | Portion (weight %) |
|---|---|
| <3 | 8.0 |
| <5 | 15.2 |
| <10 | 62.4 |
| <15 | 83.2 |
| <20 | 96.7 |
| <25 | 98.8 |
| <30 | 100.0 |

EXAMPLE 13

(According to the Invention)

The alkali aluminum silicate was produced in a manner analogous to that used in Example 8 was separated from the mother liquor on a band filter.

The filter cake was washed with water acidified with p-alkylbenzene sulfonic acid (e.g., p-toluene sulfonic acid) after the suction drying zone. After the wash water had reached a pH value of 9.5, the finished product was dried at 120° C. in a rotary tube. It had the following particle spectrum.

| Fraction ($\mu$) | Portion (weight %) |
|---|---|
| <3 | 4.2 |
| <5 | 10.8 |
| <10 | 50.3 |
| <15 | 78.6 |
| <20 | 93.3 |
| <25 | 98.1 |
| <30 | 99.5 |

The particular spectra in Examples II 8 to 13 were ascertained with the sedimentation balance Cahn-Waage Elektrobalance RM2.

Zeolitic molecular sieves of Types X and Y when treated in the manner of Examples 8 through 13 showed similar results in their particle spectra.

The process of the invention can comprise, consist essentially of or consist of the steps set forth using the described materials.

The uses of zeolitic molecular sieves is illustrated in following Examples 14 and 15 wherein all parts are by weight.

EXAMPLE 14

| | |
|---|---|
| Sodium aluminum silicate obtained according to any one of Examples 9 to 13 | 45.0 |
| Sodium perborate | 20.0 |
| Washing agent powder | 35.0 |

The washing agent powder was produced, for example, by hot drying the following compositions:

| | |
|---|---|
| ABS (sodium dodecylbenzenesulfonate) | 21.0% |
| Ethoxylated tallow alcohol (1 mole tallow alcohol + 14 moles ethylene oxide) | 7.5 |
| Soap (sodium salt of saturated, essentially $C_{18}$-$C_{22}$ fatty acids) | 7.2 |
| Waterglass ($Na_2O \cdot 3.3SiO_2$) | 9.0% |
| Magnesium sulfate | 4.5 |
| Carboxymethyl cellulose | 2.0 |
| Optical brightener | 0.6 |
| Soluble complex (e.g., sodium citrate, or nitrilotriacetic acid (NTA), or ethylene diamine tetraacetic acid (EDTA), or sodium triphosphate, or POC, etc.) | 9.0 |
| Sodium sulfate | 35.0 |
| Water | Balance |

EXAMPLE 15

Perborate Free Washing Agent

| | |
|---|---|
| Ethoxylated $C_{11}$-$C_{15}$ oxoalcohol (1 mole oxoalcohol + 3 moles ethylene oxide) | *2.0% |
| Ethoxylated $C_{11}$-$C_{15}$ oxoalcohol (1 mole oxoalcohol + 13 moles ethylene oxide) | **5.0 |
| Sodium aluminum silicate prepared according to any one of Examples 9 to 13 | 40.0 |
| Soda (sodium carbonate) | 15.0 |
| Waterglass ($Na_2O \cdot 3.3SiO_2$) | 4.0 |
| Carboxymethyl cellulose | 1.5 |
| Optical brightener | 0.2 |
| Sodium sulfate | 23.0 |
| Water | Balance |

*This ingredient can be replaced by the same amount of tallow alcohol + 5 moles of ethylene oxide.
**This ingredient can be replaced by the same amount of tallow alcohol + 14 moles of ethylene oxide.

The washing agent was produced by spraying the ethoxylation product (nonionic surfactant) on the powder particles consisting of the remaining constituents.

POC is a poly(hydroxycarboxylate) prepared by the Cannizzaro reaction of a poly(aldehydocarboxylate), see Haschke U.S. Pat. No. 3,923,742.

In Examples 14 and 15 in place of the Type A zeolite, there can be used the Type X and Type Y zeolites disclosed.

The ability to use the molecular sieves of the invention in washing agents to replace phosphates is not only due to the quality of the exchange properties, but, above all, due to the particle size of the products obtained by the process of the invention. The size of the molecular sieve particles for use in washing machines, etc., is limited because at a size about 45μ difficulties occur in the dried wash (dust formation) and in the waste water system (possible sedimentation). With the process of the invention, it is possible to produce molecular sieves of the requisite particle size which avoids these problems.

The use of the alkali aluminum silicates of the invention has the advantage that the loading of the environment with phosphate will no longer occur. Eutrophication of the waters, seas and rivers will no longer result to the presently known extent if the molecular sieves of the invention are employed in the washing agent.

Except for replacing of the phosphate by the molecular sieve, the washing agents are the same as those conventionally employed in the art. Thus, there can be used the conventional detergents, e.g., anionic, cationic and nonionic detergents. Thus, as detergents there can be used, for example, higher alkyl sulfate detergents, particularly the alkali metal salts of sulfates having 8 to 22 carbon atoms in the alkyl residue such as sodium lauryl sulfate, potassium lauryl sulfate, sodium octadecyl sulfate, sodium coconut fatty alcohol sulfate, sodium octanyl sulfate, sodium alkyl ($C_{14}$-$C_{18}$) sulfate, as well as the corresponding long chain aliphatic sulfonates, e.g., sodium octanyl sulfonate, sodium dodecyl sulfonate, sodium tetradecyl sulfonate, sodium octadecyl sulfonate, potassium dodecyl sulfonate, ammonium dodecyl sulfonate, and sodium decyl sulfonate, higher alkyl ether sulfates, higher alkyl glyceryl ether sulfonates, higher alkyl phenol polyethylene oxide sulfates, polyoxyethyl ethers of fatty alcohols, polyethylene oxide condensates with higher alkyl phenols such as isooctyl and nonyl phenol condensed with 3 to 20 moles of ethylene oxide, sodium o-xylene sulfonate, potassium xylene sulfonate, potassium tertiary octylbenzene sulfonate, potassium dodecyl toluene sulfonate, sodium p-xylene sulfonate, sodium propyl naphthalene sulfonate, sodium butylnaphthalene sulfonate, lauramidodipropyl dimethyl benzyl ammonium chloride and N-diethylamino oleylamide hydrochloride.

There can also be present conventional additives including bleaching agents; e.g., sodium perborate, water softeners, e.g., borax, as well as other additives including sodium carbonate, sodium sulfate and potassium carbonate, as well as polyvinyl alcohol, carboxymethyl cellulose, etc.

The amount of detergent and the amount of molecular sieve builder can be varied widely, e.g., 5–90% of detergent and 95-10% of the builder based on these two materials.

The other materials can be omitted if desired.

The compositions can comprise, consist essentially of, or consist of the materials set forth.

What is claimed is:

1. In a process of preparing sodium aluminate silicate Type A zeolite molecular sieve powder with an average particle diameter of less than 10μ by hydrothermal cyrstallization of a sodium aluminum silicate mixture, separating the crystallization product from the aqueous mother liquor, drying, and then comminuting the improvement comprising reducing the portion of particle having a size above 45μ to less than 1 weight % by adjusting the pH of the aqueous surrounding the crystallization product to 8.5 to 11 prior to the drying by addition of an acid before separation of the crystallization product from a slurry of product in mother liquor.

2. The process of claim 1 wherein the pH of the aqueous medium surrounding the crystallization product is adjusted to between 9 and 10.5.

3. The process of claim 1 wherein the acid is sulfuric acid.

* * * * *